US012623556B2

(12) United States Patent
Laemmle et al.

(10) Patent No.: US 12,623,556 B2
(45) Date of Patent: May 12, 2026

(54) ROADWAY COVERPLATE

(71) Applicant: Mahle International GmbH, Stuttgart (DE)

(72) Inventors: Christopher Laemmle, Stuttgart (DE); Timo Laemmle, Kernen (DE); Holger Schroth, Maulbronn (DE)

(73) Assignee: MAHLE INTERNATIONAL GMBH (DE)

( * ) Notice: Subject to any disclaimer, the term of this patent is extended or adjusted under 35 U.S.C. 154(b) by 1258 days.

(21) Appl. No.: 17/489,773

(22) Filed: Sep. 29, 2021

(65) Prior Publication Data

US 2022/0126708 A1      Apr. 28, 2022

(30) Foreign Application Priority Data

Sep. 30, 2020      (DE) ...................... 10 2020 212 391.8

(51) Int. Cl.
| | |
|---|---|
| *B60L 53/12* | (2019.01) |
| *B60L 53/38* | (2019.01) |
| *E02D 29/14* | (2006.01) |
| *E04B 5/04* | (2006.01) |
| *E04C 2/52* | (2006.01) |

(Continued)

(52) U.S. Cl.
CPC ............... *B60L 53/12* (2019.02); *B60L 53/38* (2019.02); *E02D 29/14* (2013.01); *E04B 5/04* (2013.01); *E04C 2/521* (2013.01); *E04G 15/061* (2013.01); *E04G 15/068* (2013.01); *E04H 6/42* (2013.01)

(58) Field of Classification Search
CPC .......... B60L 53/12; B60L 53/38; B60L 53/30; E02D 29/14; Y02T 10/70; E04B 5/04; E04H 6/00
See application file for complete search history.

(56) References Cited

U.S. PATENT DOCUMENTS

| | | | | |
|---|---|---|---|---|
| 9,103,655 B2 * | 8/2015 | Enthaler | ............... | B60L 53/126 |
| 2014/0361635 A1 * | 12/2014 | Ookawa | .................. | H02J 50/10 |
| | | | | 307/104 |

(Continued)

FOREIGN PATENT DOCUMENTS

| | | |
|---|---|---|
| DE | 20 2017 104 271 U1 | 10/2018 |
| DE | 10 2017 117 623 A1 | 2/2019 |

(Continued)

OTHER PUBLICATIONS

Machine translation of WO-2014192817-A1. (Year: 2014).*

(Continued)

*Primary Examiner* — Drew A Dunn
*Assistant Examiner* — Pamela J Jeppson
(74) *Attorney, Agent, or Firm* — Fishman Stewart PLLC

(57) ABSTRACT

A roadway coverplate for an assembly of an inductive charging device for inductively charging a motor vehicle, may include a main body and a cover. The main body may have an upper side for parking a motor vehicle and a lower side facing away from the upper side. The main body, on the lower side, may include a depression configured to receive the assembly. The cover may cover the depression and may, outside the depression, bear on a bearing portion of the lower side. The cover may be coupled in a force-fitting manner to the lower side in the bearing portion and may be configured to conjointly support a load acting on the upper side.

19 Claims, 9 Drawing Sheets

(51) Int. Cl.
   *E04G 15/06*      (2006.01)
   *E04H 6/42*      (2006.01)

(56)        References Cited

U.S. PATENT DOCUMENTS

| | | | |
|---|---|---|---|
| 2015/0225906 A1* | 8/2015 | Curran .................. | B60M 7/003 |
| | | | 404/1 |
| 2016/0143194 A1* | 5/2016 | Yanagida ................ | H02J 50/70 |
| | | | 307/104 |
| 2018/0158599 A1* | 6/2018 | Kamikihara ............ | H01F 27/40 |
| 2020/0139829 A1* | 5/2020 | Laemmle ............... | H02J 50/005 |

FOREIGN PATENT DOCUMENTS

| | | | | |
|---|---|---|---|---|
| EP | 3438366 A1 * | 2/2019 | ............... | E04B 5/04 |
| WO | WO-2014192817 A1 * | 12/2014 | ............ | B60L 11/182 |
| WO | 17/060387 A1 | 4/2017 | | |

OTHER PUBLICATIONS

Machine translation of EP-3438366-A1. (Year: 2019).*
English abstract for DE- 20 2017 104 271.
English abstract for DE-10 2017 117 623.

\* cited by examiner

ROADWAY COVERPLATE

CROSS-REFERENCE TO RELATED APPLICATIONS

This application claims priority to German Patent Application No. DE 10 2020 212 391.8, filed on Sep. 30, 2020, the contents of which is hereby incorporated by reference in its entirety.

TECHNICAL FIELD

The present invention relates to a roadway coverplate for an assembly of an inductive charging device which is used for inductively charging a motor vehicle that is situated on the roadway coverplate. The invention moreover relates to a functional group having such a roadway coverplate and an assembly of an inductive charging device.

BACKGROUND

In the case of electrically or partially electrically driven motor vehicles, regular charging of an electrical energy accumulator of the motor vehicle is necessary. To this end, a direct electrical connection between the motor vehicle and an external electrical energy source, for example a mains connector, can be established in principle. This however requires a manual operation of a user.

It is furthermore known for the motor vehicle, that is to say in particular the electrical energy accumulator, which can be a rechargeable battery for example, to be inductively charged. Corresponding charging devices here have in each case one assembly in the motor vehicle and outside the motor vehicle. A primary coil is situated in the assembly outside the motor vehicle and inductively interacts with a secondary coil of the assembly in the motor vehicle in order for the motor vehicle to be charged. The assembly in the motor vehicle is also referred to as a motor vehicle assembly or vehicle assembly. The assembly outside the motor vehicle when in operation is typically situated below the motor vehicle and is also referred to as a ground assembly.

In order for the ground assembly to be used in a simplified manner and to be better protected in relation to external influences and manipulations, it is known, for example from WO 2017/060387 A1, for the primary coil of the ground assembly to be integrated in concrete that is capable of being magnetized.

From DE 10 2017 117 623 A1 it is known for the ground assembly to be integrated in a concrete slab which simultaneously serves as a roadway. This concrete slab simultaneously serves as a cover part and is thus a roadway coverplate. In order for the assembly to be integrated, the roadway coverplate has a recess which by way of a protective layer is protected in relation to external influences, such as, for example, in relation to the ingress of water. The roadway coverplate furthermore has a reinforcement which runs along a lower side of the roadway coverplate.

SUMMARY

The present invention is concerned with the object of stating improved or at least different embodiments for a roadway coverplate of the type mentioned above as well as for a functional group having such a roadway coverplate and an assembly of an inductive charging device, said embodiments being distinguished in particular by an improved application capability and enhanced reliability.

This object is achieved according to the invention by the subject matter of the independent claim(s). Advantageous embodiments are the subject matter of the dependent claim(s).

The present invention is based on the general concept of providing, in a roadway coverplate, on a lower side of a main body of the roadway coverplate, a depression for receiving an assembly of an inductive charging device and of closing off the depression by a cover which outside the depression, on the lower side, is fastened in a force-fitting manner to the main body and is configured for absorbing loads by way of the main body. The provision of the depression on the lower side enables the upper side of the roadway coverplate to remain unchanged, in particular an integrity of the upper side to be maintained. The provision of the depression on the lower side moreover enables a simplified integration of the assembly in the roadway coverplate. At the same time, the assembly is better protected in relation to external influences, in particular as a result of unauthorized manual interference. The application capability of the roadway coverplate is thus improved. The force-fitting fastening of the cover to the lower side on the main body leads to a transmission of force between the main body and the cover, which thus conjointly supports a load acting on the roadway coverplate. The knowledge that the provision of the depression on the lower side leads to a weakening of the mechanical properties, in particular to a reduction in terms of the load-bearing capability, of the main body, is utilized here. The force-fitting fastening and the cover are consequently designed in such a manner that said fastening and said cover compensate for or at least increase the reduced load-bearing capability which is associated with the depression and the material weakening resulting therefrom in the region of the depression. In other words, the reduced load-bearing capability by way of the force-fitting fastening of the cover is counteracted to the extent that the main body in the region of the depression can transfer the load to the cover. Accordingly, the risk of damage to the roadway coverplate by overloading is at least reduced. The application capability as well as the reliability are thus improved.

Corresponding to the concept of the invention, the roadway coverplate has the main body which is preferably produced from concrete. The main body is in particular a concrete main body. The main body has the upper side as well as the lower side, wherein the lower side faces away from the upper side. The upper side serves for parking a motor vehicle, in particular in order to inductively charge the motor vehicle by way of the assembly. According to the invention, the depression which is covered by the cover is provided on the lower side of the main body. The cover here outside the depression bears on a bearing portion of the lower side and in the bearing portion is fastened in a force-fitting manner to the main body. The cover and the force-fitting fastening are designed in such a manner that the cover conjointly supports loads acting on the upper side.

When in use, the roadway coverplate by way of the upper side serves for parking a motor vehicle, in particular moreover as a roadway lane. The lower side of the roadway coverplate is accessible when in use. In particular, the roadway coverplate can furthermore function as a cover. The roadway coverplate thus generally serves both as a roadway and as a cover. The roadway coverplate is hereunder also referred to as a coverplate for short.

The coverplate is used in particular in public spaces where inductive charging of motor vehicles is desired or intended. The coverplate is in particular used in a multi-storey car park. A plurality of coverplates of this type can be used in the multi-storey car park, wherein the respective coverplate can be a parking bay or a component part of a parking bay.

As explained above, the cover as a result of the force-fitting fastening serves for improving the mechanical stability of the coverplate, in particular for receiving and transmitting forces, in particular loads, acting on the main body. The cover here is expediently conceived to this end. The cover in particular has corresponding mechanical properties. For this purpose, the cover is configured for example having a corresponding strength and/or stiffness.

The depression in general terms is a recess in the main body that is open on the lower side. In principle, the depression here can be subsequently incorporated in the main body. The depression is preferably conjointly produced during the production of the main body.

The coverplate can at least in part be produced from concrete that is capable of being magnetized.

The coverplate is expediently prefabricated and is installed on-site. The installation can include, for example, connecting the coverplate to at least one support and/or to at least one further coverplate.

The fastening of the cover to the main body is expediently releasable and reproducible. Access to the depression, for instance for installing and/or servicing the assembly, is thus enabled in a simplified manner.

The cover is advantageously disposed so as to be completely outside the depression. This means in particular that the cover does not invade the depression. This leads to an increased mechanical stability of the cover and consequently an improved load-bearing action by the cover. Improved reliability results therefrom.

The cover is preferably configured so as to be planar and as a plate. The cover is thus preferably a coverplate which outside the depression bears on the bearing portion and in the bearing portion is fastened in a force-fitting manner to the main body. The plate-shaped configuration of the cover leads in particular to an increased flexural strength of the cover and consequently an increased mechanical stability and an increased potential load-bearing action. The reliability is further improved in this way.

In principle, the cover can be produced from any arbitrary material and/or substance as long as the cover conjointly supports the load acting on the upper side by way of transmission of force to the cover.

Embodiments in which the cover is produced from metal and/or a metal alloy are preferred. The cover is thus a metal cover, preferably a metal plate. This results in a high mechanical stability of the cover and consequently an increased potential load-bearing action. Moreover, for component parts of the assembly that are situated in the depression, the cover in this way acts as a magnetic and/or electromagnetic shield towards that side of the cover that faces away from the upper side.

The cover is advantageously produced from aluminium or copper.

The cover advantageously has a high electrical conductivity. Said cover, in particular by virtue of the eddy currents created in the cover, thus shields the alternating electromagnetic field built-up by the primary coil in relation to the region on that side of the cover that faces away from the upper side. A high electrical conductivity of the cover thus ensures minor losses and a minor degree of self-heating of the cover.

It is conceivable for the cover to be configured in multiple tiers. The cover can thus have two or more successive tiers fixed to one another. The cover preferably has at least one metal tier and/or metal alloy tier.

The cover preferably has aluminium and/or copper for the shield, and steel and/or CFRP for increasing the load-bearing capability. CFRP here stands for "carbon-fibre reinforced plastics material", preferably "carbon-fibre reinforced polymer".

The cover advantageously has at least one copper and/or aluminium tier and at least one steel and/or CFRP tier. It is preferable here when the tier with the highest electrical conductivity, in particular the at least one copper and/or aluminium tier, is disposed on the side that faces the depression, and the materials with the highest strength or stiffness, respectively, in particular the at least one steel and/or CFRP tier, are disposed on that side of the cover that faces away from the depression.

An improved mechanical stability of the roadway coverplate is achieved by providing at least one reinforcement in the main body between the depression and the upper side, said reinforcement running at least in part, preferably at least between the depression and the upper side, transversely to a spacing direction from the upper side to the lower side.

The coverplate preferably has a tray which is inserted and received in a force-fitting manner in the depression. The tray here, conjointly with the cover, delimits an interior space for receiving the assembly or at least component parts of the assembly. The cover and the tray can thus form a housing of the assembly.

The tray is advantageously configured for receiving and transferring local loads, that is to say in particular loads which act directly in the region of the depression and can arise by way of a wheel of a motor vehicle for example. A transmission of force and load from the main body to the tray here takes place by way of the force-fitting reception of the tray in the depression, wherein the tray advantageously transfers this load to the main body, preferably to the cover. The tray is correspondingly conceived for this purpose, is thus in particular configured having a corresponding strength and/or stiffness.

The transfer of the load from the tray to the cover preferably takes place by way of at least one support element which is disposed in the interior space and which extends in the spacing direction. The respective support element here is disposed locally in the interior space.

The tray advantageously has a preferably can-shaped main portion that bears in the depression, as well as a collar that projects from the main portion. The collar here, outside the depression, preferably bears on the bearing portion of the lower side. The cover is preferably disposed on that side of the collar that faces away from the lower side. It is thus preferable for the collar to be disposed in the bearing portion between the lower side and the cover.

The tray is preferably permanently received in a force-fitting manner in the depression.

The depression and/or the tray, and thus the interior space, are expediently configured for receiving at least some component parts of the assembly of the inductive charging device. The depression and the tray are in particular configured for receiving at least one coil of the assembly.

The assembly is expediently a primary assembly of the inductive charging device which has at least one primary coil of the charging device. The charging device here, in the respective motor vehicle to be charged, furthermore has a secondary assembly having at least one secondary coil which inductively interacts with the at least one primary coil. The primary assembly is thus in particular a ground assembly.

The tray is advantageously a plastics-material tray. Said tray thus does not influence the alternating electromagnetic field built-up by the primary coil, or said influence is at least reduced.

The tray is preferably fibre-reinforced. This leads to an improved stability of the tray and thus to an increased load-bearing capability of the tray. The mechanical stability of the coverplate is thus increased, and the reliability is thus further improved. The tray particularly preferably comprises fibre-composite material, is in particular a tray made from fibre-composite material.

The at least one upper reinforcement, at least in a portion disposed between the depression and the upper side, is conceived for the electromagnetic interaction of the assemblies.

The at least one upper reinforcement is preferably a fibrous reinforcement, for example a carbon reinforcement, in particular a CRFP reinforcement. An aramid-fibre reinforcement is alternatively also possible. An improved mechanical stability of the coverplate as well as advantageous properties during inductive charging are thus achieved.

The upper side of the coverplate preferably corresponds to the upper side of a normal coverplate, in particular a normal roadway. This means that the upper side of the coverplate is flat and/or planar. In particular, the depression and the ground assembly cannot be identified and/or seen from the upper side. A marking, in particular visual marking, which signals the presence of the ground assembly to a user can be provided on the upper side here.

In preferred embodiments, a receptacle which is open on the upper side and in which a connection means is received is configured in the bearing portion of the main body. The connection means, conjointly with an associated connection means which hereunder is also referred to as the mating connection means, here forms a connection which fastens the cover to the main body. Moreover, the connection by way of the collar preferably fastens the tray to the main body. The fastening takes place in such a manner that the cover is fastened in a force-fitting manner to the main body. The fastening furthermore preferably takes place in such a manner that the tray is received in a force-fitting manner in the depression. This means that the tray and the cover, at least in the state fastened as achieved by the connection, is attached in a force-fitting manner to the main body. The connection here leads to an improved transmission of force between the main body and the cover, preferably moreover between the main body and the tray, as well as between the tray and the cover. The connection consequently leads to an improved mechanical stability and consequently improved reliability.

It goes without saying that two or more such connections can also be provided, said connections fastening the cover, preferably moreover the tray, conjointly to the main body. The connections here, in particular along the bearing portion, are advantageously disposed so as to be distributed in a preferably uniform, mutually spaced apart manner. A uniform force-fitting fastening, and consequently a uniform transmission of force, between the main body and the cover, preferably moreover between the main body and the tray, is thus achieved.

The respective connection and thus the fastening can be releasable, as explained above. This enables the cover to be released from the main body. The same preferably applies in an analogous manner to the tray. In principle, it is thus possible for the tray and the cover, as a component part of the housing of the assembly, to be conjointly fastened to the main body.

The respective connection means and the associated mating connection means can in principle be of an arbitrary design.

The respective connection means and the associated mating connection means preferably interact in a force-fitting and/or form-fitting manner. Embodiments in which at least one of the at least one connection is a screw connection are preferred. This leads to a simple and effective implementation of the connection. This furthermore leads to an effective and reliable transmission of force between the main body and the cover, preferably moreover the tray.

In preferred embodiments an associated reinforcement, which hereunder is also referred to as the lower reinforcement, is provided for at least one of the connection means. The lower reinforcement here is connected in a force-fitting manner to the associated connection means. The force-fitting connection is implemented by the surrounding concrete material for example. In preferred embodiments, the lower reinforcement encloses the associated connection means. Alternatively or additionally, the lower reinforcement can be connected to the associated lower connection means in a materially integral manner, for example by welding. The lower reinforcement is integrated in the main body, extends preferably below the lower side and along the lower side. This means that the lower reinforcement at least in part extends transversely to the spacing direction. By connecting the connection means to the lower reinforcement, an improved transmission of force between the main body and the cover takes place by way of the lower reinforcement and the associated connection means such that the mechanical stability and consequently the reliability are further improved. The same applies when the tray is fastened to the main body by way of the connection means. It is preferable here for the respective connection means to be connected to such a lower reinforcement.

In preferred embodiments, at least one of the at least one connection means has a threaded element having a thread, and the associated mating connection means has a bolt, in particular a screw, having an associated mating thread. The connection, in particular as a pure screw connection, can thus be implemented in a simple and mechanically stable manner. Moreover, a stable connection between the threaded element and the associated lower reinforcement, and consequently an improved transmission of force, is achieved in this way. It is preferable here for the threaded element to have an internal thread and on the side that faces away from the internal thread to be configured so as to be planar and to be enclosed by the associated lower reinforcement. This prevents or at least reduces the risk of damage to the lower reinforcement that surrounds the threaded element.

It is conceivable for a can which conjointly with the cover delimits a volume for an electrical supply of the assembly to be attached on that side of the cover that faces away from the upper side. It is thus possible for the assembly to be electrically supplied in a simplified manner. The electrical supply can comprise an electrical connector and/or power electronics of the assembly. An electrical supply line, in particular an electricity line, for supplying the assembly is connected or able to be connected to the connector here. The supply line here is guided to the connector on the side that faces away from the internal volume. This simplifies the mounting and the servicing of the assembly.

It is also conceivable for the supply line to be guided through the main body. While the supply line is thus better protected, this is associated with a weakening of the mechanical properties of the main body.

It is conceivable for the can to be releasably fastened to the cover by way of at least one of the at least one connection. The handling is thus in particular improved.

The coverplate preferably has at least one steel reinforcement which is received in the main body and which from the main body protrudes transversely to the spacing direction. The installation of the coverplate takes place in particular by way of the steel reinforcement. For example, a connection to a further coverplate and/or a support can be performed using the steel reinforcement, in particular with the aid of on-site concrete. The at least one steel reinforcement is spaced apart from the depression transversely to the spacing direction. The influence of the steel reinforcement on the electromagnetic interaction of the assembly with the motor vehicle is thus prevented or at least reduced. It is preferable here for the coverplate to have at least two such steel reinforcements which are disposed on sides of the depression that face away from one another transversely to the spacing direction and which are disposed so as to be spaced apart from the depression and in each case protrude from the main body.

Embodiments in which at least one of the at least one upper reinforcement is attached to at least one of the at least one steel reinforcement so as to be spaced apart from the depression in such a manner that a transmission of force takes place between the steel reinforcement and the upper reinforcement have proven advantageous. In particular, the upper reinforcement, over a sufficient portion which transversely to the spacing direction can be between 10 and 30 cm, runs along on the steel reinforcement at a spacing between 0 and 10 mm, thus overlaps the steel reinforcement such that a transmission of force between the upper reinforcement and the steel reinforcement takes place by way of the surrounding concrete material. Despite the steel reinforcement which is interrupted at least in the region of the depression, an improved mechanical stability of the coverplate can thus be achieved. Embodiments in which the coverplate has two such steel reinforcements which are disposed on sides of the depression that face away from one another are particularly advantageous here, wherein the upper reinforcement is attached to both steel reinforcements. This leads to an effective improvement of the mechanical stability of the coverplate.

It is advantageous for the coverplate to have two or more upper reinforcements which are mutually spaced apart along the spacing direction.

Preferred embodiments provide that at least one of the at least one lower reinforcement comprises carbon. In particular, at least one of the at least one lower reinforcement is a carbon reinforcement, advantageously a CFRP reinforcement.

As a result of the concept according to the invention, the coverplate and the depression can in principle each be provided with any arbitrary dimension in the spacing direction.

The depth of the depression in the spacing direction here can be, for example, between 50% and 75% of the thickness of the main body in the spacing direction. For example, the thickness of the main body can be between 80 mm and 140 mm, and the depth of the depression can be between 40 mm and 100 mm. A spacing of the depression from the upper side in the spacing direction, hereunder also referred to as the overlap, here is between 20 mm and 50 mm for example.

The, preferably prefabricated, coverplate can have component parts of the assembly in the depression, or in the interior space, respectively.

It is more application-friendly when the coverplate is initially installed on-site and component parts of the assembly are subsequently mounted in the depression, in particular in the interior space. This means that the coverplate can be retrofitted with the assembly.

It is preferable here for a placeholder to be disposed in the depression, in particular in the interior space, until the components of the assembly are mounted in the depression, or in the interior space, respectively. The placeholder serves the purpose of transmitting load from the upper side through the depression to the cover. Accordingly, the placeholder has at least one support element which runs between the cover and the upper side and bears on the cover and which transmits the load from the upper side to the cover. The placeholder preferably has two or more such support elements which are disposed so as to be distributed in the depression. The placeholder can in particular be composed of such support elements.

The coverplate can have two or more such depressions which are in each case covered by such an associated cover. It is also conceivable for at least two mutually spaced apart depressions to be covered by one common cover of this type. The coverplate in particular in this case can be sized for parking two or more vehicles and/or for configuring two or more roadway lanes.

It goes without saying that, apart from the coverplate, a functional group having the coverplate and the assembly which is at least in part received therein is also within the scope of this invention. At least component parts of the assembly, preferably at least one coil of the assembly, are thus received in the interior space of the functional group.

Further important features and advantages of the invention emerge from the dependent claims, from the drawings, and from the associated description of the figures by means of the drawings.

It goes without saying that the previously mentioned features and the features yet to be explained hereunder can be used not only in the respective stated combination but also in other combinations, or individually, without departing from the scope of the present invention.

Preferred exemplary embodiments of the invention are illustrated in the drawings and are explained in more detail in the description hereunder, wherein identical reference signs relate to identical or similar or functionally equivalent components.

DETAILED DESCRIPTION

Figure 1:
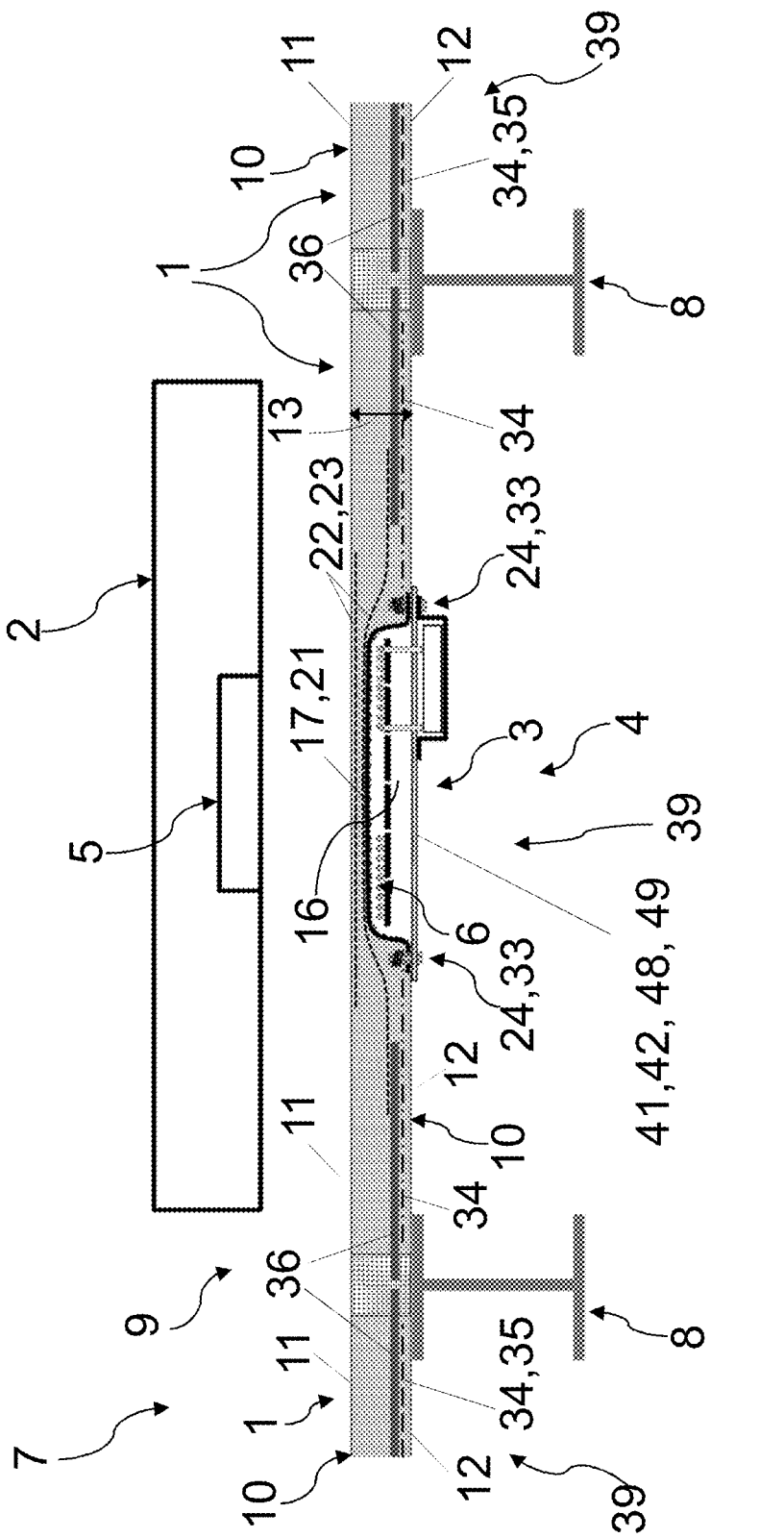
FIG. 1 shows a section through a multi-storey car park having a functional group which comprises a roadway coverplate and an assembly.

A roadway coverplate 1, as is shown in FIGS. 1 to 9 for example, is used for parking a motor vehicle 2 (see FIG. 1) as well as for the inductive charging of the motor vehicle 2. The roadway coverplate 1, hereunder also referred to as the coverplate 1 for short, here is designed for receiving an assembly 3 of an inductive charging device 4 for inductively charging the motor vehicle 2, as can be derived from FIG. 1. An associated functional group 39 comprises the coverplate 1 and at least parts of the assembly 3.

In a manner corresponding to FIG. 1, the charging device 4, apart from the assembly 3 which is received in the coverplate 1 and hereunder is also referred to as the ground assembly 3, in the motor vehicle 2 to be charged has a further assembly 5 which hereunder is also referred to as the motor vehicle assembly 5. The ground assembly 3 comprises at least one primary coil 6 which inductively interacts with at least one secondary coil (not shown) of the motor vehicle assembly 5 in order to charge the motor vehicle 2, that is to say in particular a rechargeable battery (not shown) of the motor vehicle 2.

Figure 8:
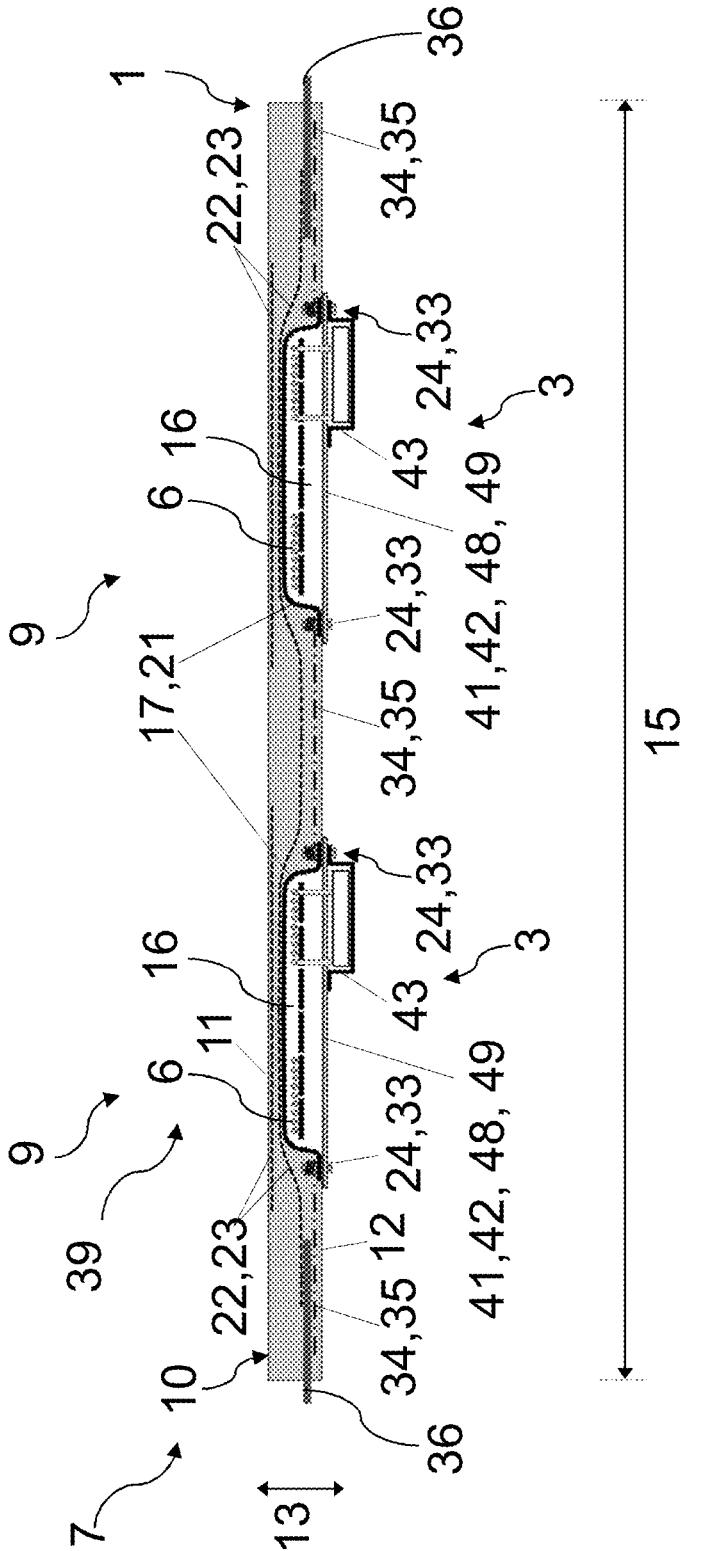
FIG. 8 shows a section through the functional group in a further exemplary embodiment.

The coverplate 1 is used in particular in publicly accessible spaces, in the exemplary embodiments of FIG. 1 and FIG. 8 in a multi-storey car park 7. The coverplate 1 here serves for parking the motor vehicle 2 and thus also as a roadway, as well as a cover. The coverplate 1 can be supported by at least one support 8, in particular of the multi-storey car park 7, as can be derived from FIG. 1. The coverplate 1, in particular by way of the support 8, here can be connected to further coverplates 1. The coverplate 1 forms in particular at least one parking bay 9 for a motor vehicle 2, or is a component part of the at least one parking bay 9. In the exemplary embodiments of FIGS. 1 to 7 as well as FIG. 9, the coverplate 1 here forms one parking bay 9. In the exemplary embodiment of FIG. 8, the coverplate 1 forms two parking bays 9.

In a manner corresponding to FIGS. 1 to 9, the coverplate 1 has a main body 10 which is preferably a concrete element. The main body 10 is configured so as to be plate-shaped and has an upper side 11 as well as a lower side 12 that faces away from the upper side 11. The upper side 11 serves for parking the motor vehicle 2 and thus also as a roadway. The upper side 11 here is configured so as to be closed and flat and/or planar. The plate-shaped configuration of the coverplate 1 in a spacing direction 13 from the upper side 11 to the lower side 12 is demonstrated in particular in that a thickness 14 (see FIG. 2) of the main body 10 in the spacing direction 13 is smaller than a width 15 of the main body 10 transversely to the spacing direction 13.

At least one depression 16 that is open on the lower side 12 is provided on the lower side 12 in the main body 10. The main body 10 has such a depression 16 in the exemplary embodiments of FIGS. 1 to 7 as well as 9. Two such depressions 16 are provided in the main body 10 in the exemplary embodiment of FIG. 8. In the exemplary embodiments of FIGS. 1 to 7 as well as 9, the depression 16 in a purely exemplary manner is disposed so as to be centric along the width 15. The depression 16 serves for receiving the ground assembly 3 or at least parts of the ground assembly 3. The respective depression 16 in the exemplary embodiments shown serves for receiving an associated ground assembly 3. The respective parking bay 9 in the exemplary embodiment of FIG. 8 here is assigned one depression 16 and one ground assembly 3.

The depression 16 here is covered and closed off by a cover 41 which is disposed on that side of the depression 16 that faces away from the upper side 11. The cover 41 outside the depression 16 bears on a bearing portion 20 of the lower side 12 and in the bearing portion 20 is fastened in a force-fitting manner to the main body 10. A transmission of load from the main body 10 to the cover 41 thus takes place such that the cover 41 conjointly supports the load, for example of the motor vehicle 2, acting on the upper side 11. The cover 41 is correspondingly configured for this purpose, has in particular a corresponding strength and/or stiffness. The reduced load-bearing capability of the main body 10 linked to the associated depression 16 is thus at least partially, preferably completely, compensated for by the respective cover 41.

In the exemplary embodiments shown, the respective cover 41 is configured as a planar plate 48, preferably from metal, that is to say preferably configured as a metal plate 49. The cover 41 in this way additionally acts as a shield plate 42 for magnetically and/or electromagnetically shielding towards that side of the cover 41 that faces away from the upper side 11. The cover 41 in the exemplary embodiments shown is disposed so as to be entirely outside the depression 16. In the exemplary embodiment of FIG. 8, the respective depression 16 is assigned such a cover 41.

The cover 41 in the depression 16 delimits an interior space 40 in which in the functional group 39 component parts of the associated ground assembly 3, for example at least one primary coil 6, are mounted and received.

In the exemplary embodiments of FIGS. 1 to 6 as well as 8 and 9, a tray 17 is received in a force-fitting manner in the respective depression 16. The tray 17 has a main portion 18 which in the associated depression 16 bears on the lower side 12. The tray 17 furthermore has a, preferably encircling, collar 19 which projects from the main portion 18 and which outside the associated depression 16 bears on the bearing portion 20 of the lower side 12. The tray 17 here, conjointly with the associated cover 41, delimits the interior space 40. In the exemplary embodiments shown, the tray 17 is produced from plastics material and is in particular a plastics-material tray 21. The tray 17 here can be fibre-reinforced. The tray 17 is preferably entirely fibre-reinforced, in particular made from fibre-composite material. As a result of the force-fitting connection between the tray 17 and the main body 10, a force is transmitted between the main body 10 and the tray 17. In this way, the mechanical weakening of the main body 10 caused by the depression 16, in particular the reduced load-bearing capability, is compensated for or at least improved, in particular when loads act locally on the main body 10 in the region of the depression 16, for example as a result of a wheel (not shown) of a motor vehicle 2.

In the exemplary embodiments of FIGS. 1 to 5 as well as 8 and 9, the collar 19 of the respective tray 17 here is disposed between the bearing portion 20 and the cover 41. The cover 41 thus bears on the bearing portion 20 with the collar 19 intervening therebetween.

In the exemplary embodiments shown, at least one reinforcement 22 which hereunder is also referred to as the upper reinforcement 22 is provided between the depression 16 and the upper side 11. The upper reinforcement 22 is integrated in the main body 10 and expediently suitable for the electromagnetic interaction of the assemblies 3, 5 such that said upper reinforcement 22 does not influence said electromagnetic interaction. The at least one upper reinforcement 22 is preferably a fibrous reinforcement 23, in particular made from carbon fibres, CFRP and the like. The at least one upper reinforcement 22 here at least in portions, preferably at least between the depression 16 and the upper side 11, runs transversely to the spacing direction 13, in particular along the width 15. In the exemplary embodiment shown, two upper reinforcements 22 which are mutually spaced apart in the spacing direction 13 can be seen.

Figure 6:
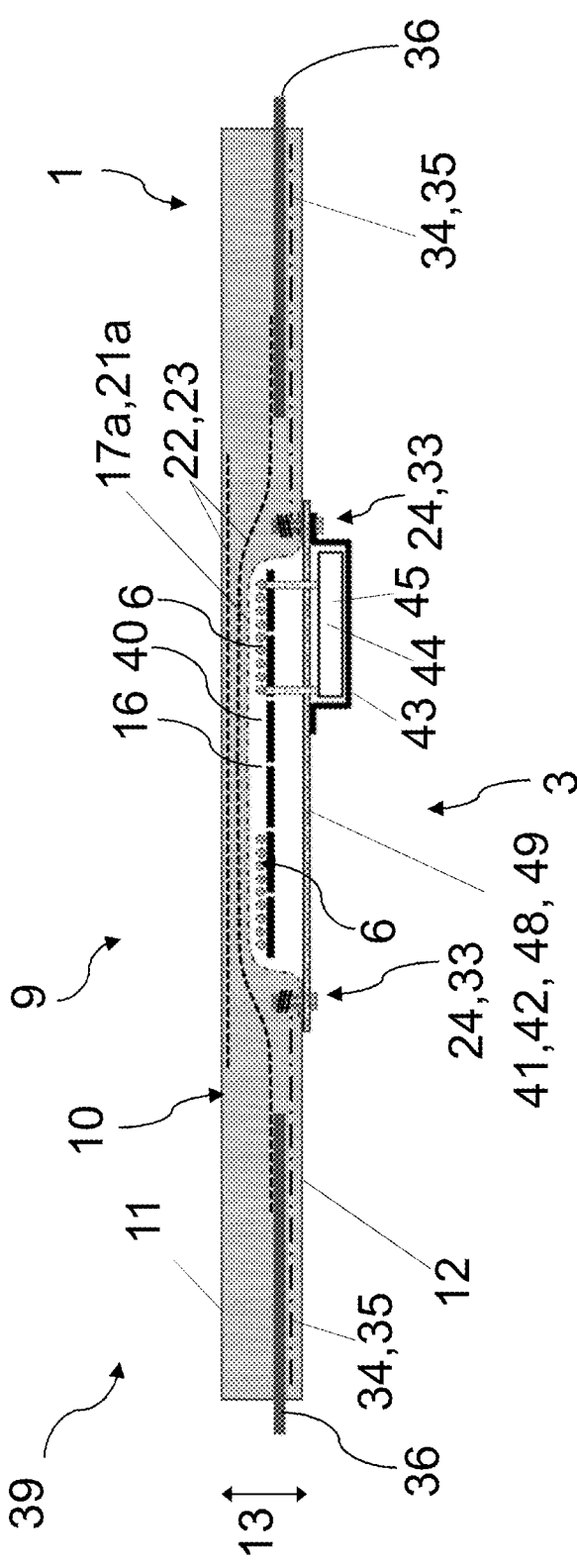
FIG. 6 shows a section through the functional group in another exemplary embodiment.
Figure 7:
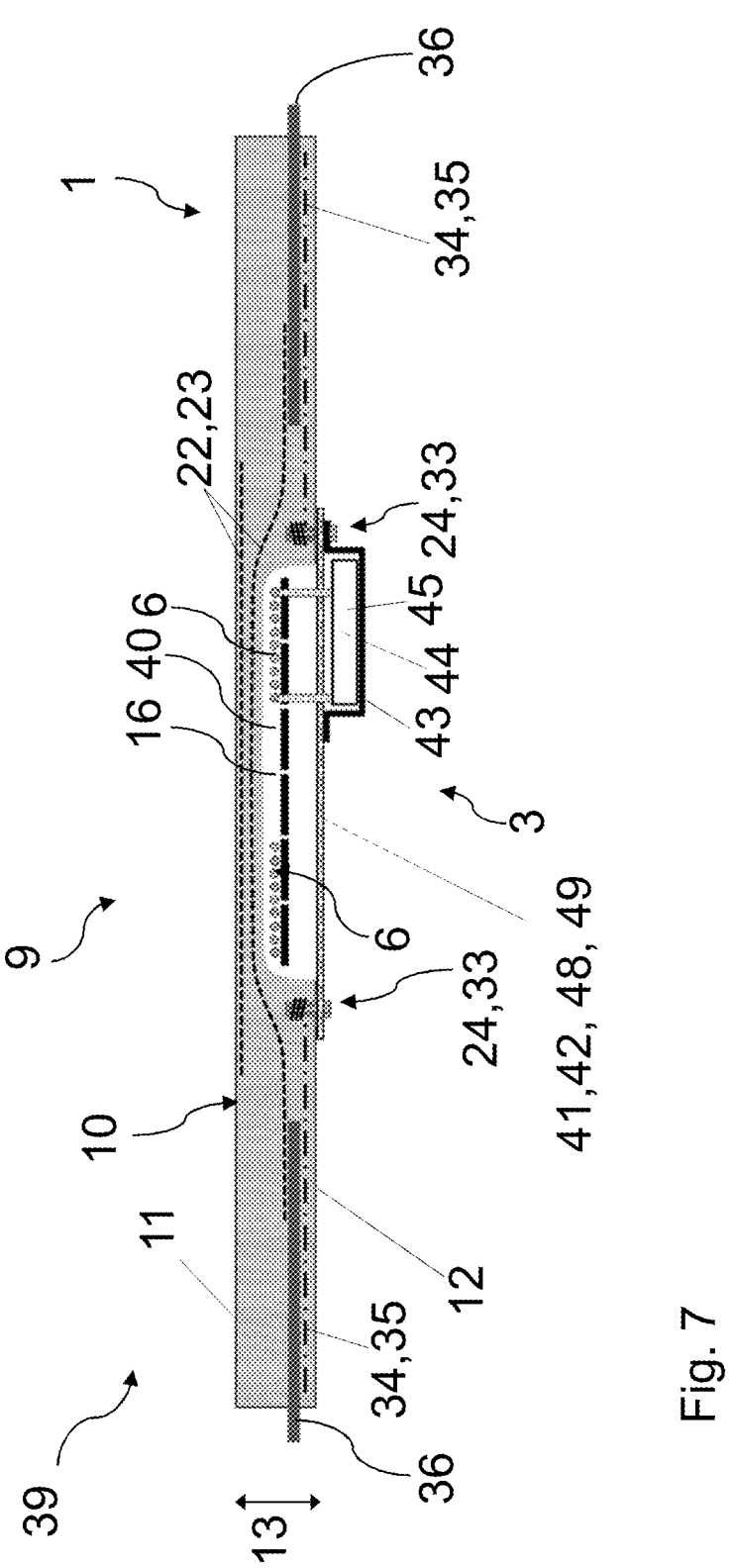
FIG. 7 shows a section through the functional group in a further exemplary embodiment.
Figure 9:
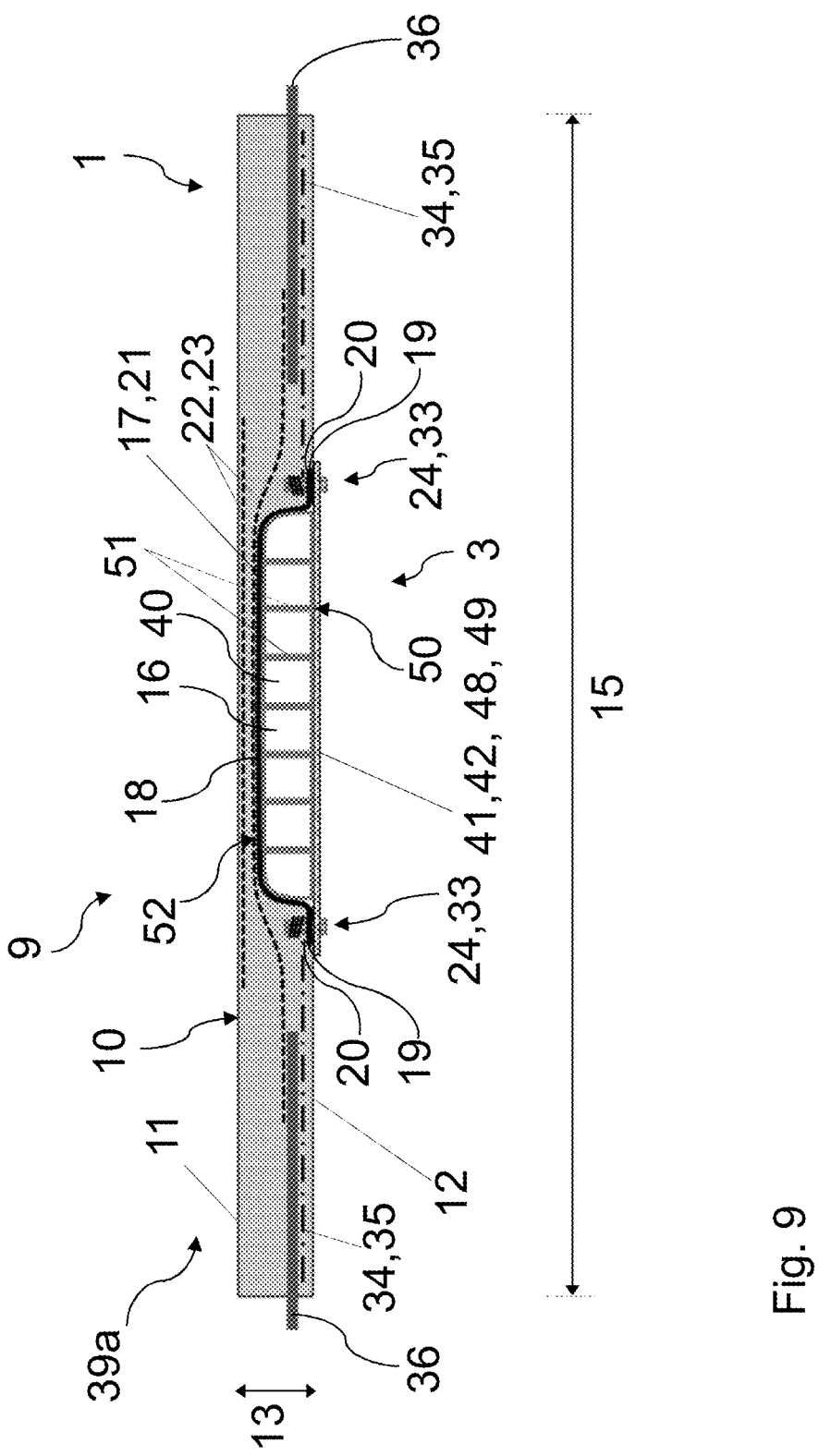
FIG. 9 shows a section through the roadway coverplate.

In each of the exemplary embodiments of FIGS. 1 to 4 as well as FIGS. 8 and 9, one tray 17 which in comparison to the tray 17 of the exemplary embodiment of FIG. 6 has a greater wall thickness is provided. The tray 17 of the exemplary embodiment of FIG. 6 has thus a lower load-bearing capability than the trays 17 of the exemplary embodiments of FIGS. 1 to 4 as well as FIGS. 8 and 9. This can be compensated for by a stronger upper reinforcement 22.

Figure 4:
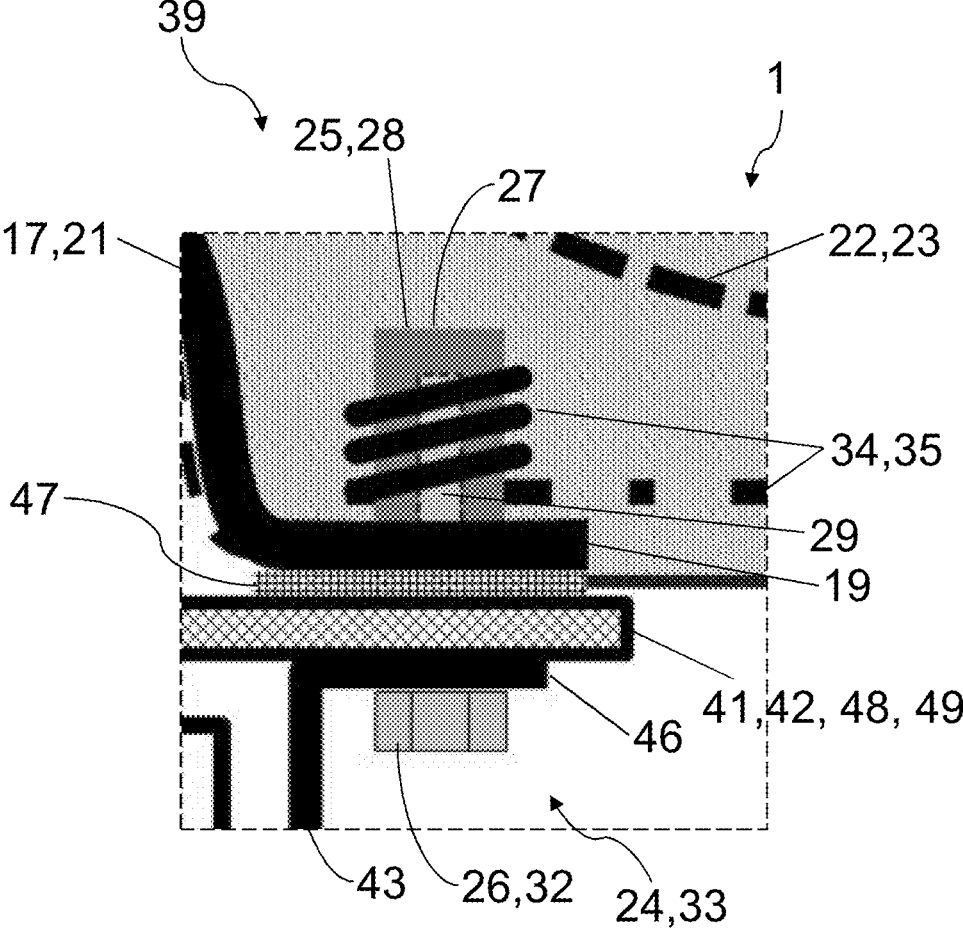
FIG. 4 shows an enlarged view of the region marked with IV in FIG. 3.
Figure 5:
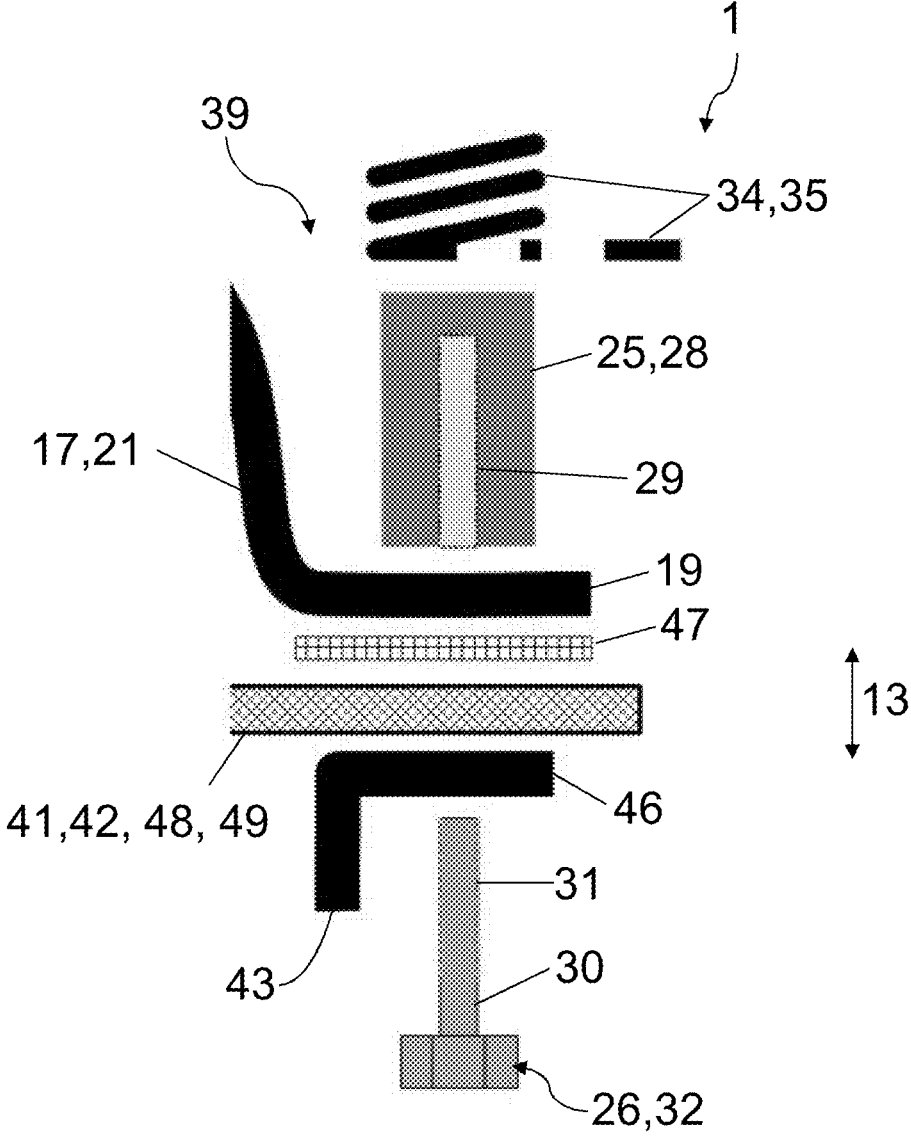
FIG. 5 shows an exploded illustration of specific parts from FIG. 4.

In the exemplary embodiments shown, the cover 41 by way of at least one connection 24 is releasably connected to the lower side 12 on the main body 10 in such a manner that the cover 41 is fastened in a force-fitting and releasable manner to the main body 10. In the exemplary embodiments shown, here a plurality of such connections 24 are provided, wherein two of the connections 24 can in each case be seen in FIGS. 1 and 2 as well as in FIG. 6, FIG. 7 and FIG. 9. FIGS. 3 to 5 show in each case views having one of the connections 24, wherein FIG. 4 shows the region marked with IV in FIG. 3 in an enlarged manner. Two such connections 24 for the respective cover 41, thus a total of four connections 24, can be seen in the view of FIG. 8.

The respective connection 24 has a connection means 25 which is received in the main body 10, and a connection means 26 which is associated with said connection means 25 and conjointly with the latter forms the connection 24, wherein said associated connection means 26 hereunder for improved differentiation is also referred to as the mating connection means 26.

The main body 10 in the region of the bearing portion 20 here has a receptacle 27 for the respective connection means 25, the connection means 25 being received in said receptacle 27. The respective connection means 25 of the exemplary embodiment shown by way of a thread 29 interacts with a mating thread 31 of the associated mating connection means 26 in the exemplary embodiments. The connection means 25 here is a threaded element 28 having an internal thread 29 (cf. FIG. 5) and a threadless external surface. The associated mating connection means 26 has a bolt 30 having an external thread 31, is in particular a screw 32. The respective connection 24 is thus configured as a screw connection 33.

Figure 2:
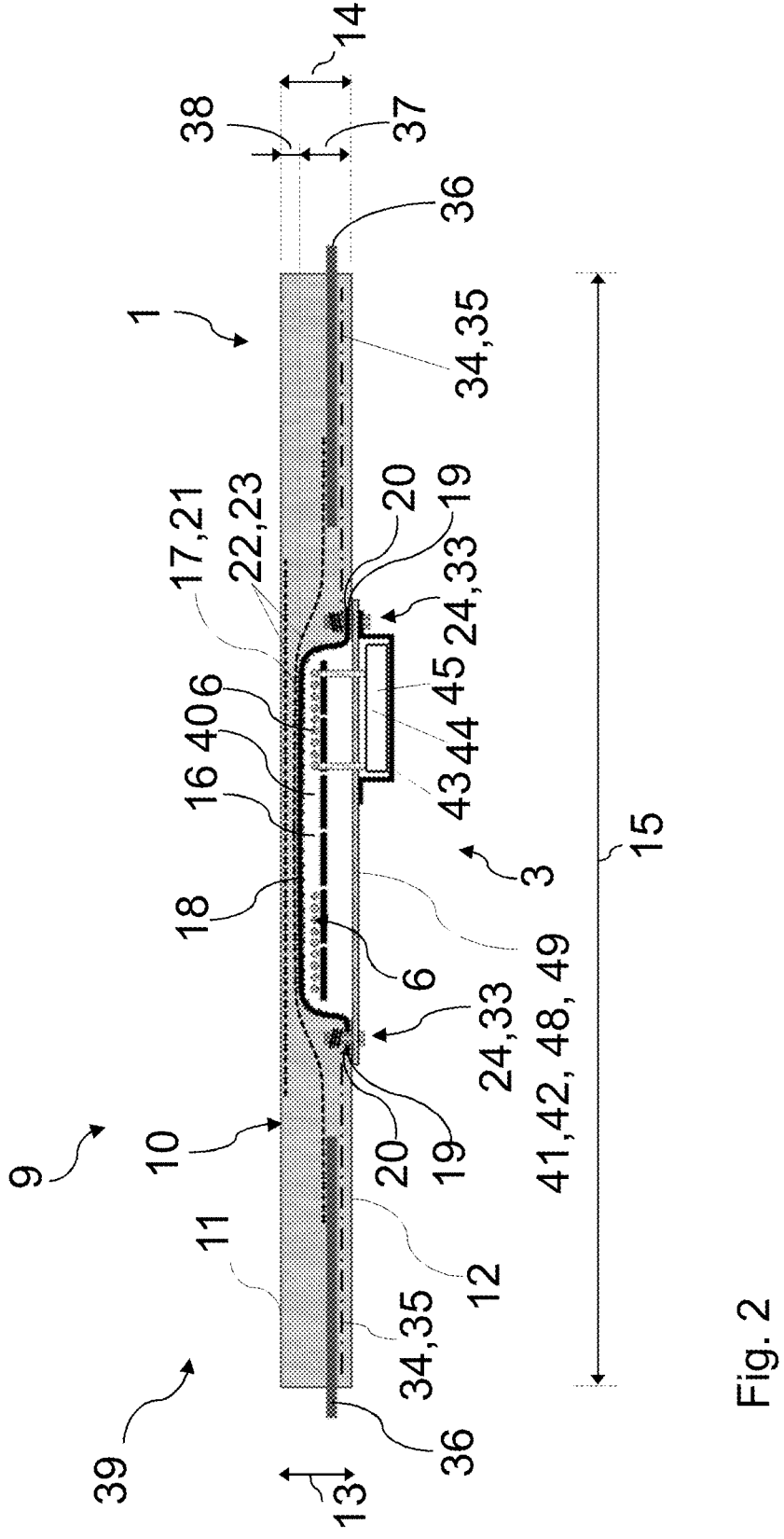
FIG. 2 shows a section through the functional group.
Figure 3:
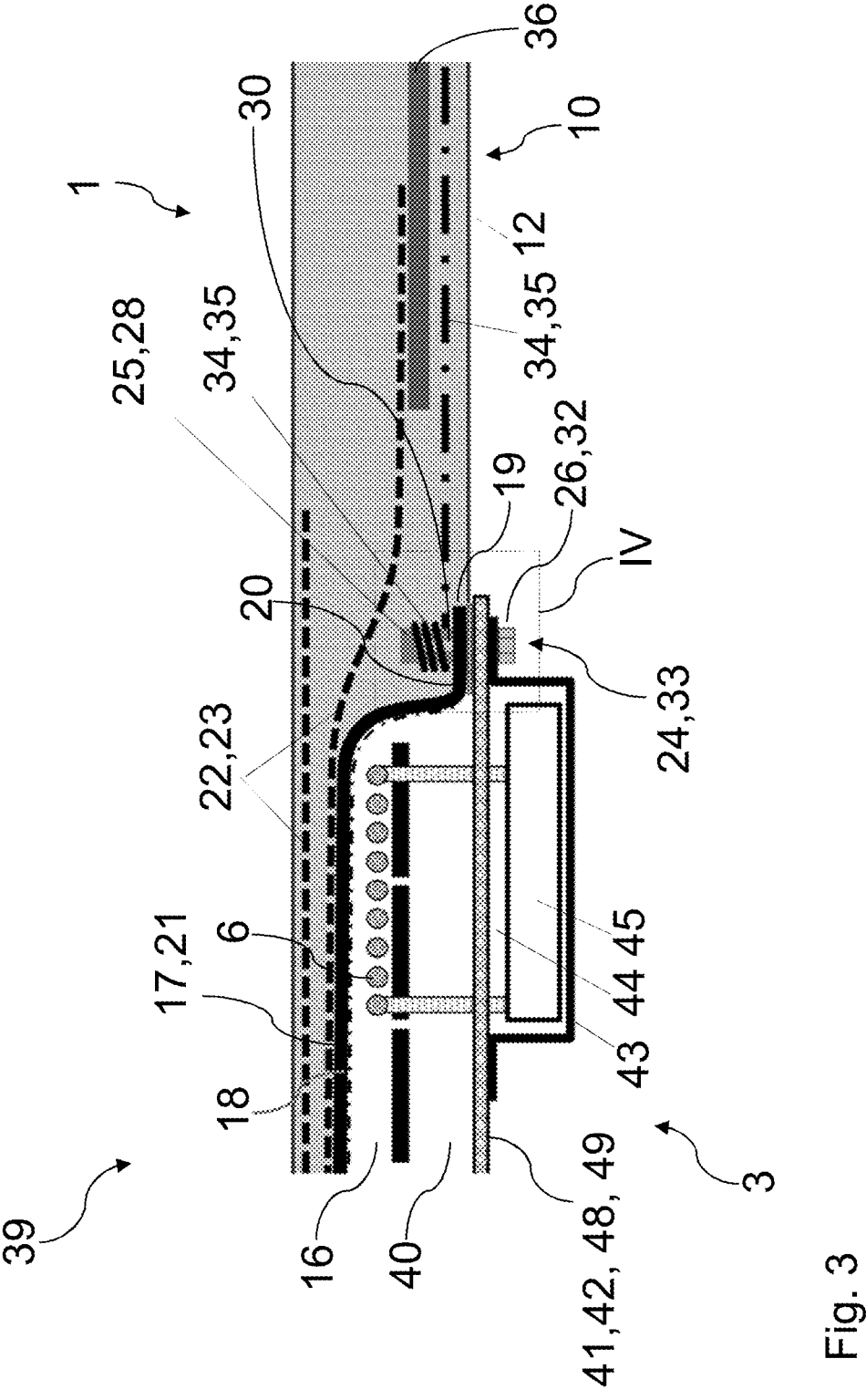
FIG. 3 shows part of the section from FIG. 2.

As can be derived for example from FIGS. 2 and 3 as well as from FIGS. 6 to 9, the coverplate 1 can have at least one reinforcement 34 which is integrated in the main body 10, runs along the lower side 12 and in relation to the depression 16 is spaced apart transversely to the spacing direction 13, said reinforcement 34 hereunder also be referred to as the lower reinforcement 34. The lower reinforcement 34 thus at least in portions runs transversely to the spacing direction 13. The lower reinforcement 34 here, as can be derived in particular from FIG. 3 and FIG. 4, at least by way of the main body is connected in a force-fitting manner to at least one connection means 25 that is received in the main body 10. In the exemplary embodiments shown, the lower reinforcement 34 and at least one of the connection means 25, in particular the threaded element 28, is wound on the external side. The connection of the lower reinforcement 34 is thus reinforced conjointly with the associated connection means 25. In the illustrations of the exemplary embodiments in FIGS. 1 and 2 as well as FIG. 6, in FIG. 7 and in FIG. 9, two such lower reinforcements 34 can be seen, wherein the respective lower reinforcement 34 encloses an associated one of the connection means 25. In total, two lower reinforcements 34 can thus in each case be seen in FIGS. 1 and 2 as well as FIG. 6, in FIG. 7 and in FIG. 9, said reinforcements 34 on sides of the depression 16 that face away from one another being disposed transversely to the spacing direction 13, along the width 15 in the views shown. In the exemplary embodiment of FIG. 8, a further lower reinforcement 34 is disposed between the depressions 16 and connected to in each case one of the connection means 24 associated with the respective depression 16, or the associated cover 41, respectively. The respective lower reinforcement 34 preferably comprises carbon, is in particular carbon-reinforced. For example, the respective lower reinforcement 34 is a carbon reinforcement 35, or CFRP.

As can be derived for example from FIGS. 1 and 2 as well as FIGS. 6 to 9, the coverplate 1 can have at least one steel reinforcement 36 which extends transversely to the spacing direction 13 and is spaced apart from the respective depression 16. The steel reinforcement 36 here extends transversely to the spacing direction 13 and protrudes from the main body 10. In the sectional views shown in FIGS. 1 and 2 as well as FIGS. 6 to 9, two such steel reinforcements 36 can be seen here. In the exemplary embodiments of FIGS. 1 and 2 as well as FIG. 6, FIG. 7 and FIG. 9, the steel reinforcements 36 disposed on sides of the depression 16 that face away from one another. In the exemplary embodiment of FIG. 8, in each case one steel reinforcement 36 in the view shown is disposed on that side of one of the depressions 16 that faces away from the other depression 16. The respective steel reinforcement 36 serves for attaching the coverplate 1 in the associated application, thus in particular to an associated support 8, as can be derived in particular from FIG. 1. In the exemplary embodiments shown, the respective steel reinforcement 36 extends along the lower side 12 and on that side of the respective lower reinforcement 34 that faces away from the lower side 12.

In the exemplary embodiment shown, the upper reinforcement 22 that is proximal to the depression 16 outside the depression 16 extends transversely to the spacing direction 13 as a result of a curvature on both sides towards the two steel reinforcements 36, and by way of the two steel reinforcements 36 has in each case an overlap with one of the upper reinforcements 22 of preferably between 10 cm and 30 cm. A transmission of force and load from the upper reinforcement 22, proximal to the depression 16, to the steel reinforcements 36 thus takes place by way of the main body 10. In the exemplary embodiment of FIG. 8, a common proximal upper reinforcement 22 is provided for the two depressions 16 in the view shown, said upper reinforcement 22 moreover as a result of a further curvature extending between the depressions 16 towards the lower side and running between the depressions 16 transversely to the spacing direction 13.

A depth 37 of the respective depression 16 in the spacing direction 13, also referred to as the integration depth 37, in the exemplary embodiments shown is between 50% and 75% of the thickness 14 of the main body 10. The spacing 38 between the depression 16 and the upper side 11 in the spacing direction 13, also referred to as the congruence 38, is between 25% and 50% of the thickness 14 of the main body 10.

In the exemplary embodiment of FIG. 8, the two depressions 16 as well as the covers 41 and the trays 17 are of identical configuration. Of course, depressions 16 and/or covers 41 and/or trays 17 of different configurations are however also conceivable.

In the functional group 39, at least component parts of the ground assembly 3 are at least in part received in the interior space 40 which is delimited by the cover 41, optionally moreover by the tray 17 on the side that faces away from the upper side 11. At least one of the at least one primary coil 6 is in particular received in the interior space 40. Magnetic field conductors, mountings and the like (in each case not shown) can moreover be received in the interior space 40.

In the exemplary embodiments shown in FIGS. 1 to 8, a can 43 which conjointly with the cover 41 delimits a volume 44 is disposed on that side of the respective cover 41 that faces away from the depression 16, as can be derived in particular from FIG. 3. The can 43 here can be a component part of the coverplate 1. An electrical supply 45 of the ground assembly 3 is received in the volume 44. The electrical supply 45 can include an electrical connector and/or power electronics (in each case not shown) which are/is connected to a mains connector by way of an electricity line for example.

As can be derived in particular from FIG. 4, the can 43 by way of at least one of the at least one connection 24 is releasably attached to the cover 41. The can 43 here has a projecting shoulder 46 which bears on the cover 41. The shoulder 46 and the cover 41 here, by way of the mating connection means 26 configured as a screw 33, are preloaded in relation to the collar 19 and thus fastened to the main body 10. As can be derived in particular from FIGS. 4 and 5, a seal 47 for sealing the interior space 40 can be disposed here between the collar 19 and the cover 41.

FIG. 9 in an exemplary manner shows that the coverplate 1 can be prefabricated. The coverplate 1 here does not have any component parts of the ground assembly 3 in the depression 16. Component parts of the ground assembly 3 can thus be subsequently mounted in the interior space 40, the coverplate 1 can thus be retrofitted with the ground assembly 3. If the interior space 40 is substantially empty and in particular free of component parts of the ground assembly 3, a placeholder 50 is disposed in the interior space 40. The placeholder 50 serves for transmitting a load from the upper side 11 through the depression 16 onto the cover 41. Accordingly, the placeholder 50 has at least one support element 51 which bears on the cover 41 and extends through the depression 16. The placeholder 50 in the exemplary embodiment shown has a plurality of such support elements 51 which are disposed in the depression 16 and in the spacing direction 13 extend in each case from between the tray 17 and the cover 41. The placeholder 50 thus has a mesh structure 52. The cover 41 thus absorbs a load even in the absence of any component parts of the ground assembly 3 in the depression 26, that is to say in particular prior to the mounting of the ground assembly 3. It is conceivable here for a lid (not shown) instead of the cover 41 to be used prior to the mounting of the ground assembly 3.

The invention claimed is:

1. A roadway coverplate for an assembly of an inductive charging device for inductively charging a motor vehicle, comprising:

a main body having an upper side for parking the motor vehicle and a lower side facing away from the upper side;

the main body, on the lower side, including a depression;

a cover covering the depression and which, outside the depression, bears on a bearing portion of the lower side; and a tray arranged in the depression, the tray including i) a main portion bearing on the lower side of the main body in the depression and ii) a collar projecting from the main portion and disposed at least partially outside the depression;

wherein an interior space configured to receive the assembly is defined by and between the tray and the cover in a spacing direction extending from the upper side to the lower side; and wherein the cover is coupled in a force-fitting manner to the lower side in the bearing portion and is configured to conjointly support a load acting on the upper side.

2. The roadway coverplate according to claim 1, wherein the cover is configured as a planar and closed plate.

3. The roadway coverplate according to claim 1, further comprising at least one upper reinforcement disposed in the main body between the depression and the upper side, wherein the at least one upper reinforcement extends at least in part transversely to the spacing direction.

4. The roadway coverplate according to claim 3, wherein the at least one upper reinforcement is a fibrous reinforcement.

5. The roadway coverplate according to claim 1, further comprising a connector and a mating connector, wherein:

the bearing portion includes at least one receptacle which is open on the lower side;

the connector is received in the receptacle; and the mating connector is associated with the connector and conjointly with the connector forms a connection which couples in a force-fitting manner the cover to the main body.

6. The roadway coverplate according to claim 5, further comprising a lower reinforcement connected to the connector, wherein outside the associated connector the lower reinforcement at least in part extends transversely to the spacing direction.

7. The roadway coverplate according to claim 6, wherein the lower reinforcement extends along the lower side.

8. The roadway coverplate according to claim 5, wherein:

the connector includes a threaded body received in the main body, the threaded body including a thread; and the associated mating connector includes a bolt having a mating thread.

9. The roadway coverplate according to claim 1, further comprising a can which conjointly with the cover delimits a volume for an electrical supply of the assembly, wherein the can is attached on a side of the cover that faces away from the depression.

10. The roadway coverplate according to claim 1, further comprising at least one steel reinforcement received in the main body, wherein the at least one steel reinforcement, transversely to the spacing direction, is disposed spaced apart from the depression and protrudes from the main body transversely to the spacing direction.

11. The roadway coverplate according to claim 10, further comprising at least one upper reinforcement disposed in the main body between the depression and the upper side, wherein:

the at least one upper reinforcement extends at least in part transversely to the spacing direction; and the at least one upper reinforcement is attached to the at least one steel reinforcement such that the at least one upper reinforcement is disposed spaced apart from the depression.

12. The roadway coverplate according to claim 1, wherein the bearing portion of the lower side of the main body, the collar of the tray, and the cover are arranged directly one above another in the spacing direction.

13. The roadway coverplate according to claim 1, further comprising a releasable placeholder for the assembly disposed in the depression, wherein:

the placeholder includes at least one support element that extends from the cover to the main portion of the tray within the interior space; and the at least one support element is configured to transmit a load from the upper side to the cover.

14. The roadway coverplate according to claim 1, wherein the tray and the cover are structured as separate, individual components.

15. The roadway coverplate according to claim 1, wherein the main portion of the tray is generally cup-shaped and has an open end facing toward the cover in the spacing direction.

16. The roadway coverplate according to claim 1, wherein:

the main body has an underside surface and a side-surface that at least partially define the depression;

the main portion of the tray includes a bottom wall and a sidewall projecting from the bottom wall toward the cover;

the bottom wall of the tray is disposed on the underside surface of the main body; and the sidewall of the tray is disposed on the side-surface of the main body.

17. The roadway coverplate according to claim 16, wherein the collar of the tray projects transversely from a distal end of the sidewall of the tray, the distal end of the sidewall of the tray disposed opposite the bottom wall of the tray.

18. A functional group, comprising:

a roadway coverplate;

an assembly of an inductive charging device;

the roadway coverplate including:

a main body having an upper side on which a motor vehicle is parkable and a lower side facing away from the upper side;

the main body including a depression disposed in the lower side, the depression configured to receive the assembly;

a cover bearing on a bearing portion of the lower side and covering the depression; and a tray received in the depression in a force-fitting manner, the tray including i) a main portion bearing on the lower side of the main body in the depression and ii) a collar projecting from the main portion, the collar disposed at least partially outside the depression and bearing on the bearing portion of the lower side;

wherein an interior space is defined by and between the tray and the cover in a spacing direction extending from the upper side to the lower side;

wherein the cover is coupled in a force-fitting manner to the bearing portion of the lower side of the main body and is configured to conjointly support a load acting on the upper side; and wherein the assembly is, at least in part, received in the interior space.

19. A roadway coverplate for a motor vehicle inductive charging device, comprising:

a main body having an upper side on which a motor vehicle is parkable and a lower side facing away from the upper side;

the main body including a depression disposed in the lower side;

a planar, metal cover bearing on a bearing portion of the lower side of the main body and covering the depression; and a tray received in the depression in a force-fitting manner, the tray including i) a main portion arranged on the lower side of the main body in the depression and ii) a collar projecting from the main portion and disposed at least partially outside the depression;

wherein the collar of the tray is arranged on the bearing portion of the main body between the bearing portion of the main body and the cover in a spacing direction extending from the upper side to the lower side;

wherein the tray and the cover are structured as separate, individual components;

wherein an interior space configured to receive an assembly of the motor vehicle inductive charging device is defined by and between the tray and the cover in the spacing direction; and wherein the cover is coupled in a force-fitting manner to the bearing portion of the lower side of the main body and is configured to conjointly support a load acting on the upper side.

* * * * *